May 1, 1962 F. P. RODWICK 3,032,087
FOOD SLICER-SHREDDER
Filed April 8, 1960 3 Sheets-Sheet 3
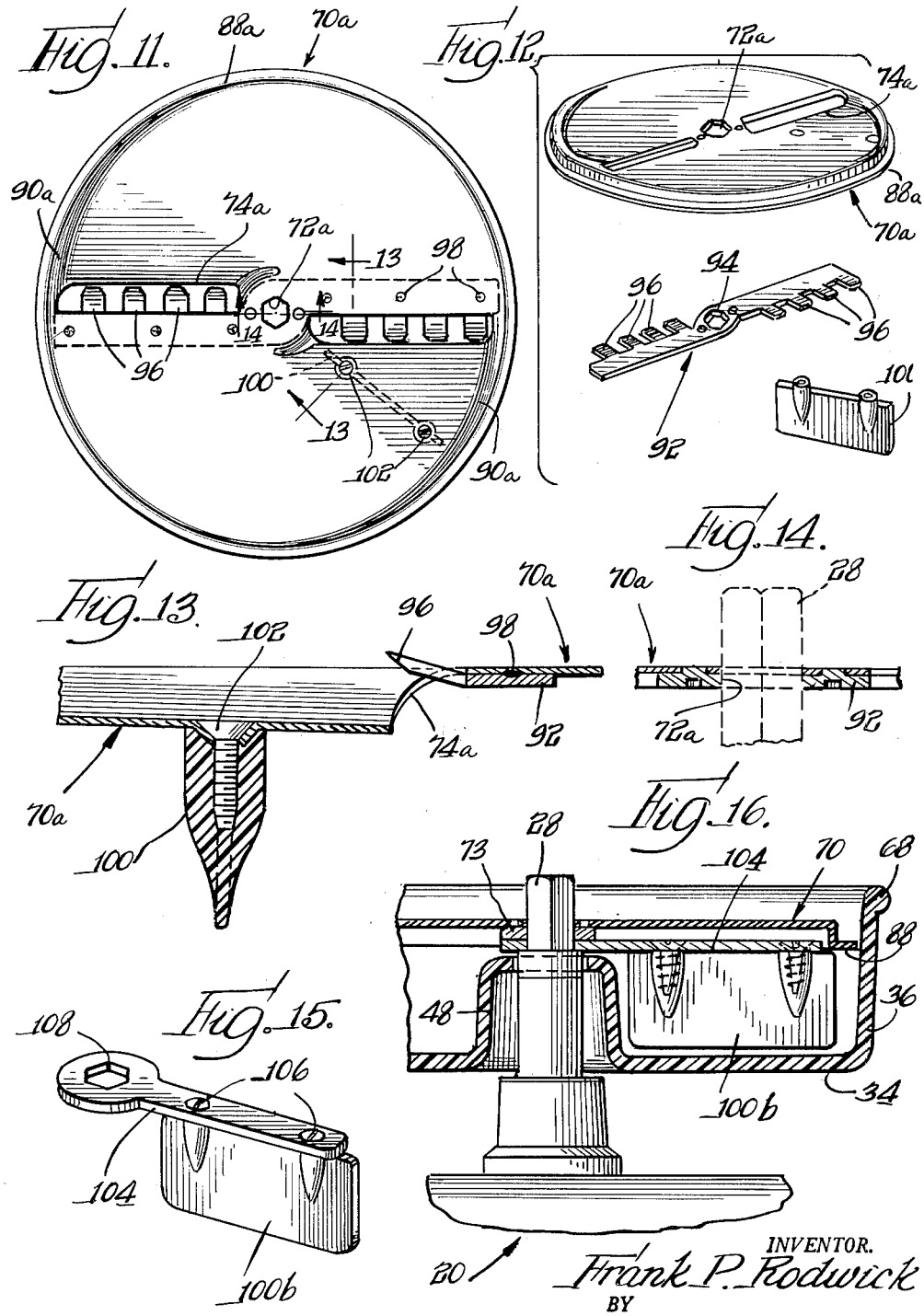
INVENTOR.
Frank P. Rodwick
BY
Olson & Trexler
attys United States Patent Office 3,032,087
Patented May 1, 1962

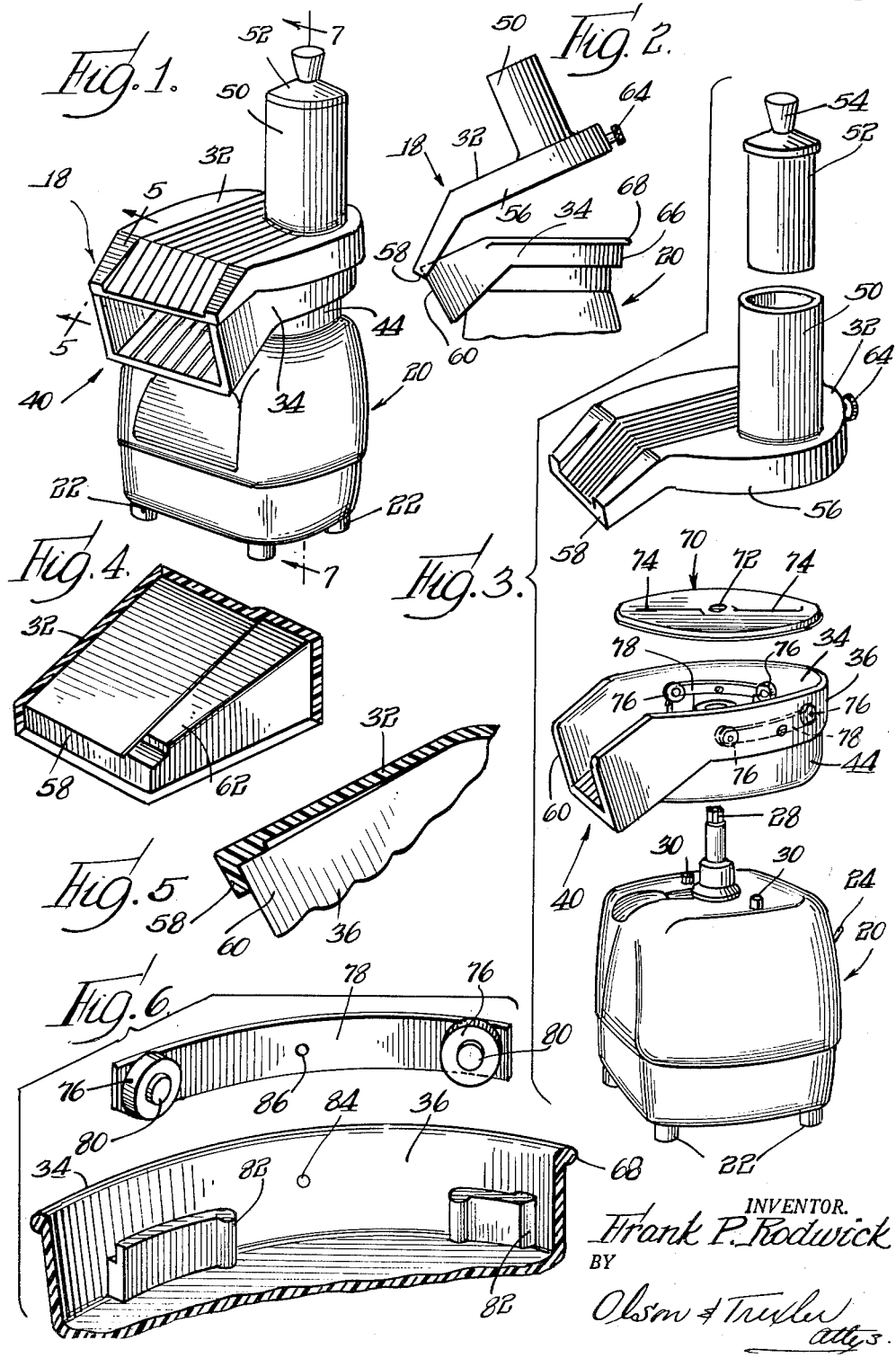

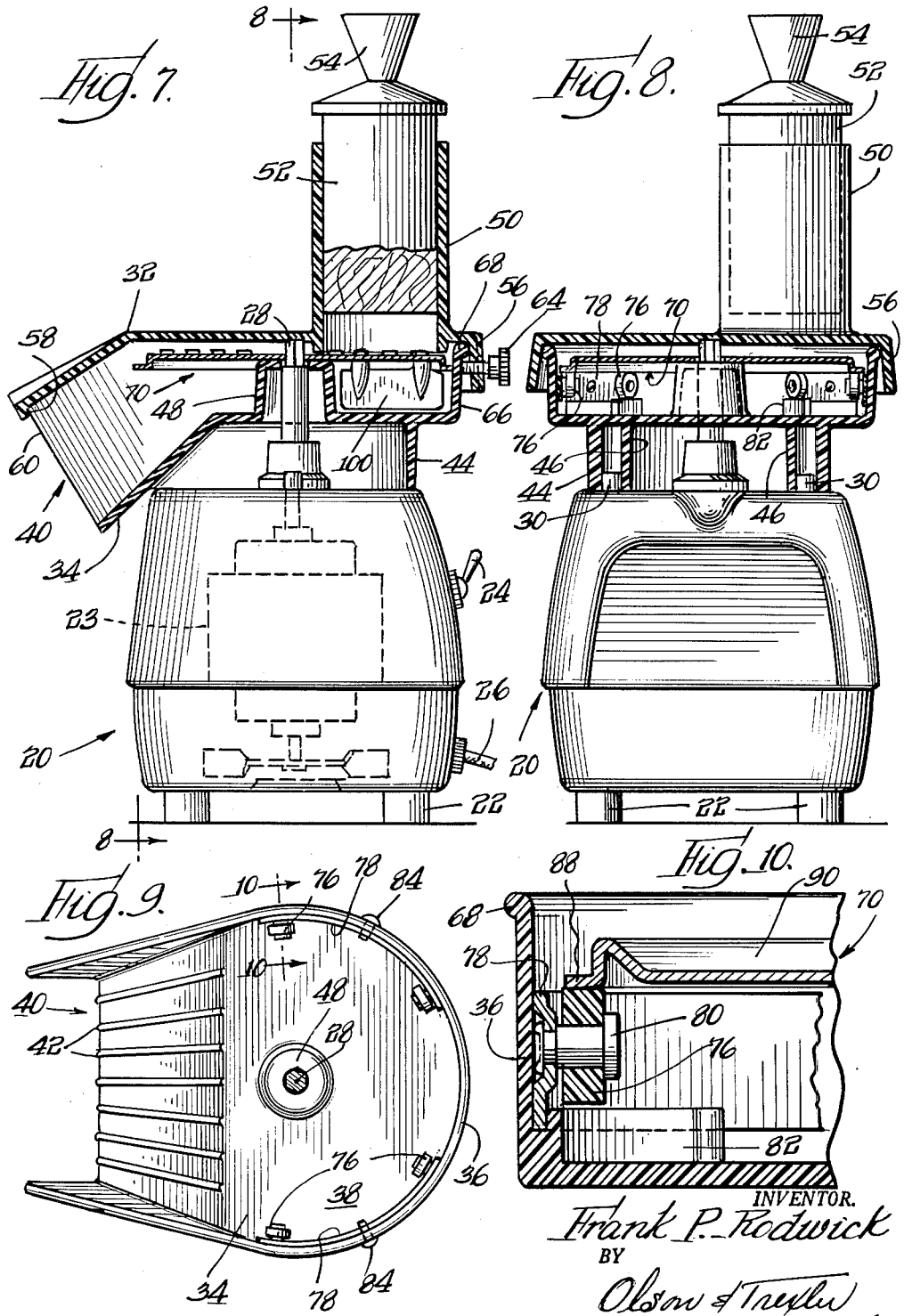

3,032,087
FOOD SLICER-SHREDDER
Frank P. Rodwick, Palos Heights, Ill., assignor to The Proctor-Silex Corporation, Philadelphia, Pa., a corporation of Connecticut
Filed Apr. 8, 1960, Ser. No. 21,025
2 Claims. (Cl. 146—125)

This invention relates generally to domestic food processing apparatus and more particularly to domestic food slicer-shredders.

In one specific aspect, the present invention relates to a motor-operated food slicer-shredder.

Devices of the type described commonly employ a rotating cutter blade and make provision for urging the food to be sliced or shredded against this rotating blade. However, the extremity of the cutter blade is generally unsupported; and consequently, more than minimal urging of the food against the blade causes the blade to flex. Repeated flexing of the blade has led to fracture or buckling thereof and concomitant damage to the entire appliance. On the other hand, when food is urged against the cutter blade with force insufficient to flex the blade materially, unduly slow processing rates are incurred to the annoyance and inconvenience of the user.

Therefore, an important object of the present invention is to provide a food slicer-shredder of the rotating blade-type in which the cutter blade is arranged to resist flexing when food is urged against it for slicing or shredding.

Another object of the invention is to provide a food slicer-shredder which is characterized by fast and efficient operation.

A more general object of the invention is to provide new and improved domestic food processing apparatus.

A further object of the invention is to provide domestic food processing apparatus which is easily cleaned after use.

A still further object of the invention is to provide improved domestic food processing apparatus from which the processed food is continuously discharged, rather than being allowed to pile up in the processing chamber.

And a still further object of the invention is to provide domestic food processing apparatus which is safe to use.

Yet another object of the invention is to provide domestic food processing apparatus which incorporates a novel ice flaker blade.

Additional objects and features of the invention pertain to the particular structure and arrangements whereby the above objects are attained.

A structure in accord with the invention includes a hopper assembly including a bowl and a cover overlying the bowl to define therebetween a circular processing chamber and a downwardly angulated discharge chute opening from the processing chamber, the cover having an elongated, upstanding feed port communicating with the processing chamber; means for securing the cover to the bowl; a power unit non-rotatably mounted to the hopper assembly therebeneath; anti-friction means adjacent the periphery of the processing chamber; processing means within the chamber including a circular plate arranged to be driven by the power unit, the plate having food-passing apertures therethrough and cutting means thereon adjacent the apertures, the processing means further including a sweeper blade adapted to rotate in coordination with the circular plate in depending relationship; and a manual pusher element for slidably entering the feed port to urge a charge of material into contact with the processing means.

The invention, both to its structure and mode of operation, will be better understood by reference to the following disclosure and drawings forming a part thereof, wherein:

FIG. 1 is a perspective view of domestic food processing apparatus constructed in accordance with the invention;

FIG. 2 is a fragmentary, side elevational view of the apparatus of FIG. 1 showing the cover being positioned on the bowl of the hopper assembly;

FIG. 3 is an exploded perspective view of the apparatus of FIG. 1;

FIG. 4 is an enlarged, fragmentary cut-away perspective view of that portion of the cover which is associated with the discharge chute;

FIG. 5 is an enlarged view taken through the section 5—5 of FIG. 1;

FIG. 6 is an enlarged, exploded perspective view showing the means for mounting the anti-friction roller assemblies within the bowl of the hopper assembly;

FIG. 7 is an enlarged view taken through the section 7—7 of FIG. 1;

FIG. 8 is a view taken through the section 8—8 of FIG. 7;

FIG. 9 is an enlarged, overhead plan view of the apparatus of FIG. 7 with the cover removed;

FIG. 10 is an enlarged view taken through the section 10—10 of FIG. 9;

FIG. 11 is an enlarged, plan view of the ice flaker means alternatively employed in the apparatus of FIG. 1;

FIG. 12 is an exploded perspective view of the elements making up the ice flaker means of FIG. 11;

FIG. 13 is an enlarged view taken through the section 13—13 of FIG. 11;

FIG. 14 is an enlarged view taken through the section 14—14 of FIG. 11;

FIG. 15 is an enlarged perspective view of a sweeper blade which may be separately provided for use in conjunction with the cutting means of the invention; and FIG. 16 is an enlarged, fragmentary, cross-sectional view of food processing apparatus in accordance with the invention showing utilization of the sweeper blade of FIG. 15.

Referring now in detail to the drawings, specifically to FIGS. 1 and 3, domestic food processing apparatus is shown to include a hopper assembly 18 and a power unit 20. Power unit 20 is supported on resilient feet 22 and incorporates an electric drive motor 23, indicated in broken outline in FIG. 7. This drive motor is selectively operated by means of an on-off switch 24 and is connected to a suitable source of electrical power as by means of a conventional drop cord indicated at 26 in FIG. 7. The output or drive shaft 28 of motor 23 is arranged to upstand from unit 20, and two studs 30 also upstand from the power unit 20 for purposes which will become apparent hereinafter.

As will be seen in the drawings, hopper assembly 18 includes a cover 32 and a bowl 34; and as is shown in FIG. 9, bowl 34 is provided with sides 36 which partially define a processing chamber 38 and which partially define a downwardly angulated discharge chute 40 having ribs 42 upraised from its floor. Bowl 34 also includes a collar portion 44 which underlies the processing chamber 38 and which is arranged to support the bowl 34 on the power unit 20 as is best shown in FIGS. 7 and 8.

A pair of hollow posts 46 are disposed inwardly of and adjacent the collar portion 44 in order to receive the studs 30 and thereby non-rotatably mount the bowl 34 over the power unit 20, as is best shown in FIG. 8. With particular reference to FIG. 7, the bowl 34 will also be seen to be provided with an apertured boss 48 centrally upraised within the processing chamber 38. The drive shaft 28 of power unit 20 extends freely through the aperture in boss 48 into the general area of processing chamber 38.

With reference to FIGS. 1–3, the cover 32 is shown to include an elongated, cylindrical, upstanding feed port 50 which opens into the processing chamber that is defined between cover 32 and bowl 34. The port 50 is adapted to receive quantities of food or other material to be sliced or shredded; and this material is readily urged downwardly against the cutting means, to be described hereinafter, by means of a pusher 52 which slidably enters the port 50. For ease in use and cleaning, the pusher 52 is preferably fabricated from a suitable wood such as maple. The cover 32 and the bowl 34 are likewise preferably fabricated from a resinous plastic material such as polystyrene and are advantageously formed as by molding. For facility in its manual manipulation, the pusher 52 advantageously incorporates an inverted frusto-conical handle 54.

The cover 32 is also formed with a flange 56 which depends around its periphery to fit over the bowl 34; and in accordance with a feature of the invention, a portion 58 of the flange 56 is canted or disposed angularly relative to the remainder of the flange. This canting of a portion of the flange 56 is arranged to position the cover 32 properly over the bowl 34, the bowl 34 being provided with a correspondingly canted portion 60 for abutting the portion 58. Additionally, cover 32 is fashioned with guide grooves 62, shown in FIG. 4, for purposes of receiving the terminal portions of the sides 36.

In assembling the cover 32 to the bowl 34, the canted portion 58 is first fitted to the correspondingly canted portion 60 with the grooves 62 receiving the terminals of the sides 36. This arrangement is best shown in FIG. 2. The cover 32 may then be lowered over the bowl 34 as by being pivoted generally about the contact between portions 58 and 60; and after the cover has come to rest over the bowl, it may be secured in place. Suitable means for securing the cover to the bowl are provided, and these means include a thumb screw 64 which extends threadedly through the flange 56 to engage a seat 66 formed externally on the sides 36 of cover 34. Screw 64 advantageously engages the seat 66 beneath an outwardly formed lip 68 on the bowl 34 in order to achieve a simple, positive coupling of the cover and the bowl. These means for securing the cover to the bowl are best shown in FIGS. 2 and 7.

As is indicated in FIG. 3, a processing element or cutter plate 70 is disposed between cover 32 and bowl 34 to be non-rotatably mounted on the drive shaft 28 as by being provided with a hexagonal aperture 72 which corresponds with and fittingly engages the hexagonal cross-section of shaft 28. Aperture 72 may be reinforced with an appropriately adapted washer 73 secured, as by welding, to the plate 70. Use of a washer 73 is indicated in FIG. 16.

In accordance with a feature of the invention, processing element 70 takes generally circular shape and is provided with food-passing apertures 74 therethrough. Cutting means, such as will be described hereinbelow, are disposed adjacent the apertures 74 for purposes of slicing, shredding or flaking the materials urged against the plate 70 by the pusher element 52. It is to be observed that variously arranged processing elements may be utilized in the present invention according to the type of processing or cutting that is specifically desired.

With particular reference to FIGS. 6, 9 and 10, the processing element 70 is arranged to be peripherally supported on anti-friction means out of contact with the boss 48. One suitable embodiment of the anti-friction means is shown in FIG. 6. There, a pair of rollers 76 are rotatably mounted at opposite ends of a tongue 78 as by means of shoulder rivets 80. The tongue 78 is arranged to be reversibly positionable and arcuately resilient; and therefore, being of slightly greater radius than the sides 36 of bowl 34, tongue 78 can be securely wedged behind the brackets 82 against the sides 36. For purposes of positioning the tongue 78, a screw or stud 84 extends through the side 36 to enter a bore 86 in the tongue. As will be recognized, rollers 76 may be advantageously formed of a material such as nylon whereas the brackets 82 may be molded integrally with the bowl 34.

Referring now to FIGS. 9 and 10, two of the roller assemblies comprising a tongue 78 and rollers 76 are disposed in peripherally spaced-apart relationship along the sides 36 of bowl 34. Furthermore, with particular reference to FIG. 10, the processing element 70 will be seen advantageously provided with a flanged portion 88 which is adapted to confront and ride on the rollers 76. Element 70 may also be provided with circumferential beads 90 spaced radially inwardly from the flanged portion 88, and these beads 90 may taper towards the respective openings 74 for added strength and convenience.

While variously arranged processing elements may be utilized for slicing or shredding a wide range of foods such as cabbage, lettuce, beets, potatoes, nuts and cheese, a processing element particularly useful for flaking ice is shown in FIGS. 11–14. The ice flaking means is shown to include a circular plate 70a having flaked ice-passing apertures 74a disposed along a diameter; and advantageously, a flanged portion 88a is arranged to ride on the rollers 76 as hereinabove described. Element 70a is additionally provided with a central aperture 72a and beads 90a in compliance with the descriptions given hereinabove.

For the embodiment of the processing element shown in FIGS. 11–14, the cutting means comprises a blade 92 having a central aperture 94 corresponding with the aperture 72a and having a number of incising elements 96. As is best shown in FIG. 13, the cutting means 92 is secured beneath the plate 70a as by weldments 98. Furthermore, the means 92 is disposed adjacent the apertures 74a with the incising elements 96 being angulated upwardly through the apertures.

It is important to note that each of the incising elements 96 is disposed at a different radial distance from the aperture 94. Thus, the elements 96 will not tend to ride in previously cut grooves in the ice being flaked; and therefore, great ease and facility in flaking the ice is achieved. It is important to point out that the cutting means 92 is selected from a relatively thick stock material in order to insure the provision of a rugged element.

In accordance with a further feature of the invention, a blade 100 is affixed on the underside of plate 70a by suitable means such as flat headed screws 102. The blade 100 is disposed radially with respect to plate 70a and is arranged to sweep out the processing chamber 38 between the boss 48 and the walls 36 of bowl 34. Accordingly, materials which have been sliced, shredded or flaked by the cutting means and which have passed through apertures 74 are not allowed to accumulate in the processing chamber 38 but rather are continuously discharged from the chute 40. The blade 100 is advantageously fabricated from a tough, resilient material such as nylon.

While it is desirable to affix the blade 100 directly to the plate 70a so that it can rotate in integral coordination with the plate, it has also been found useful to provide the blade 100 separately from plate 70a; and in FIGS. 15 and 16 such an arrangement is shown.

In FIGS. 15 and 16, a sweeper blade 100b is secured to a key 104 by screws 106; and the key 104 is provided with a hexagonal aperture 108 which is adapted to receive the hexagonally shaped end of the drive shaft 28, as is shown best in FIG. 16. When the sweeper blade 100b is incorporated, it is advantageously slipped over the drive shaft 28 underlying the plate 70.

Having thus described one construction of the invention, it is important now to state how the illustrated embodiment operates. Assuming for the moment that the parts have been disassembled, as shown in FIG. 3, for purposes of cleaning and storing the apparatus, it will become apparent that assembly may be achieved in the following manner. First, the bowl 34 will be placed over the power unit 20 with the drive shaft 28 passing through the aperture in boss 48 and with the studs 30 entering the hollow posts 46. Next, a processing element 70 with sweeper blade attached will be selected and positioned on the end of the drive shaft.

Subsequently, the cover 32 will be hooked over the bowl 34 in the manner described hereinabove and the thumb screw 64 secured in place against the seat 66. A charge of food which it is desired to slice, shred or flake will then be placed in the port 50 and the pusher element 52 will be inserted therein at rest against the charge.

Having connected the power unit 20 to a source of electrical energy as by plugging the drop cord 26 into a convenient household wall socket, a simple flick of switch 24 will energize motor 23 to drive the shaft 28 and thereby rotate the processing element 70 with its sweeper blade 100.

As the element 70 rotates, the flanged portion 88 will ride on the rollers 76 so that, when the charge is urged against the cutting elements adjacent apertures 74, substantially no flexing of the element 70 will occur. Accordingly, reasonable force may be applied by means of the pusher element 52 urging the charge against the cutting elements so as to achieve a rapid and uniform shredding, slicing or flaking operation.

As will be recognized, the general shape and configuration of the element 70 will determine the type of cut or slice which will be incurred on the charged material. Moreover, it will be recognized that as the element 70 rotates and performs its cutting action the processed slices or particles will pass through the apertures 74 to the floor of processing chamber 38. From there, the blade 100 will sweep the slices or particles from the chamber to the discharge chute 40.

When the slicing, shredding or flaking operation is completed, the assembly sequence of steps can be reversed to prepare the apparatus for cleaning and storing. It is to be pointed out that simple rinsing of the parts is ordinarily sufficient to clean them. In addition, should the rollers 76 become worn, they may be easily replaced by simply prying them from their location behind the brackets 82 and snapping a replacement assembly in position.

Thus, it will be seen that the present invention provides a domestic food processing apparatus which is safe and efficient to use, which is rugged and easily cleaned and which affords rapid slicing, shredding or flaking of a wide variety of foods and similar products; and while particular embodiments of the invention have been shown, it should be understood, of course, that the invention is not to be limited thereto since many modifications may be made. It is, therefore, contemplated to cover by the appended claims any such modifications as fall within the true spirit and scope of the invention.

The invention is claimed as follows:

1. Domestic food processing apparatus comprising: hopper means defining a circular processing chamber, a feed port eccentrically communicating with said chamber, and a discharge chute opening from said chamber arcuately spaced apart from said port, said hopper means including a bowl and a cover, each having a radial chute portion, said cover including said feed port and fittingly engaging said bowl in overlying relationship; rotatable processing means in said chamber spaced apart from the floor thereof and having apertures for passing processed material; drive means bearingly engaging said processing means centrally thereof and drivingly connected thereto; anti-friction means supportingly engaging said processing means in the vicinity of said feed port radially outwardly thereof, engagement of said chute portions positioning said feed port relative to the peripherally supported portion of said processing means; and a pusher element adapted for slidably entering said feed port to urge a charge of material into contact with said processing means.

2. Domestic food processing apparatus according to claim 1 wherein said cover includes a peripheral flange depending thereabout to fit over said bowl; wherein said bowl includes a lip outwardly formed from at least a portion of the edge thereof and a lateral sheet; and wherein said apparatus further comprises a single thumb screw threadedly extending through said flange to engage said seat beneath said lip.

References Cited in the file of this patent

UNITED STATES PATENTS

| | | |
|---|---|---|
| 1,157,013 | Lewis | Oct. 19, 1915 |
| 1,418,178 | Stelmach | May 30, 1922 |
| 2,138,716 | Truitt | Nov. 29, 1938 |
| 2,552,933 | Browne | May 15, 1951 |
| 2,793,667 | Hall | May 28, 1957 |
| 2,840,318 | Schnell | June 24, 1958 |
| 2,845,971 | Cordero | Aug. 5, 1958 |
| 2,856,976 | MacDougall | Oct. 21, 1958 |

UNITED STATES PATENT OFFICE
CERTIFICATE OF CORRECTION

Patent No. 3,032,087                                               May 1, 1962

Frank P. Rodwick

It is hereby certified that error appears in the above numbered patent requiring correction and that the said Letters Patent should read as corrected below.

Column 6, line 34, for "sheet" read -- seat --.

Signed and sealed this 16th day of October 1962.

(SEAL)
Attest:

ERNEST W. SWIDER                                    DAVID L. LADD
Attesting Officer                                        Commissioner of Patents